(12) United States Patent
Baggett et al.

(10) Patent No.: US 6,682,129 B2
(45) Date of Patent: Jan. 27, 2004

(54) FLARE MODULE TRUCK SLEEPER CAB ASSEMBLY

(75) Inventors: Raymond W. Baggett, Fort Wayne, IN (US); Anthony R. Jones, Fort Wayne, IN (US); Aaron J. Layos, Fort Wayne, IN (US); Andrew C. Scott, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/178,380

(22) Filed: Jun. 24, 2002

(65) Prior Publication Data

US 2003/0234556 A1 Dec. 25, 2003

(51) Int. Cl.$^7$ .............................................. B60R 27/00
(52) U.S. Cl. ........................... 296/190.02; 296/190.01; 296/204; 296/190.08
(58) Field of Search ....................... 296/190.01, 190.02, 296/204, 183, 187, 190.08, 196

(56) References Cited

U.S. PATENT DOCUMENTS

| | | | | | |
|---|---|---|---|---|---|
| 4,978,163 A | * | 12/1990 | Savio | ..................... | 296/190.08 |
| 5,083,834 A | * | 1/1992 | Moffatt et al. | ......... | 296/190.02 |
| 5,310,239 A | * | 5/1994 | Koske et al. | .......... | 296/190.02 |
| 5,560,673 A | * | 10/1996 | Angelo | ................... | 296/190.02 |
| 5,619,784 A | * | 4/1997 | Nishimoto et al. | ......... | 296/196 |
| 5,660,427 A | * | 8/1997 | Freeman et al. | ....... | 296/190.08 |
| 5,735,568 A | * | 4/1998 | Arnold | ................... | 296/190.02 |
| 5,769,486 A | * | 6/1998 | Novoa et al. | .......... | 296/190.08 |
| 5,863,093 A | * | 1/1999 | Novoa et al. | .......... | 296/190.01 |
| 6,123,378 A | * | 9/2000 | Teply et al. | ................. | 296/205 |
| 6,308,411 B1 | * | 10/2001 | Wright et al. | .............. | 29/897.2 |

* cited by examiner

Primary Examiner—Joseph D. Pape
Assistant Examiner—Lori L Coletta
(74) Attorney, Agent, or Firm—Jeffrey P. Calfa; Dennis Kelly Sullivan; Susan L. Lukasik

(57) ABSTRACT

A combined truck cab having a forward operator section and an aft living unit is constructed utilizing an underbody providing a central floor area, left side and right side flare modules providing longitudinal side walls, outer portions of the floor aft of an operator area and outer portions of the back wall, and a center back wall section between the outer portions of the back wall provided by the flare sections. The longitudinal side wall narrow on one another forward from the back wall and the outer floor portions narrow from rear to front.

10 Claims, 24 Drawing Sheets

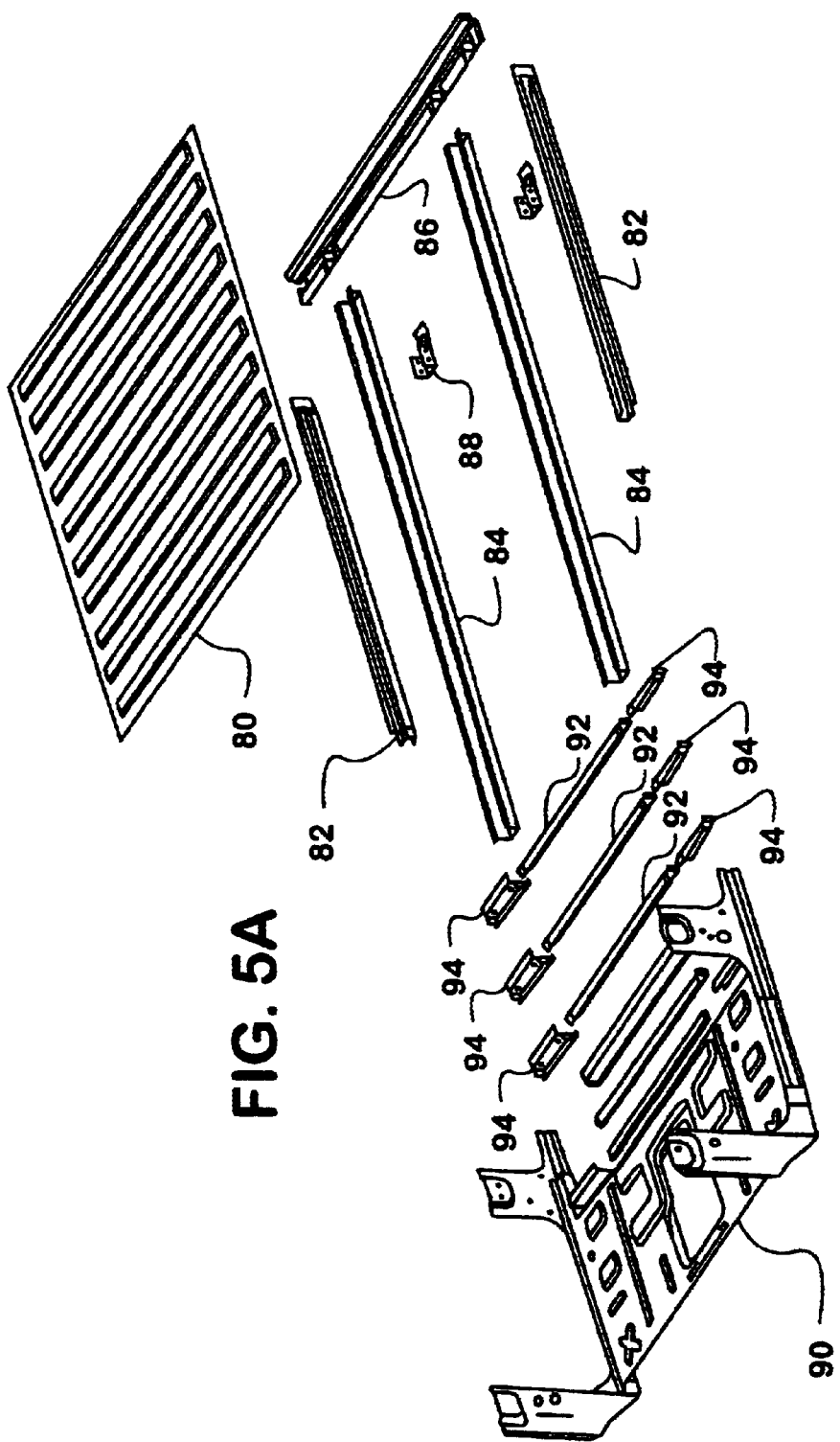

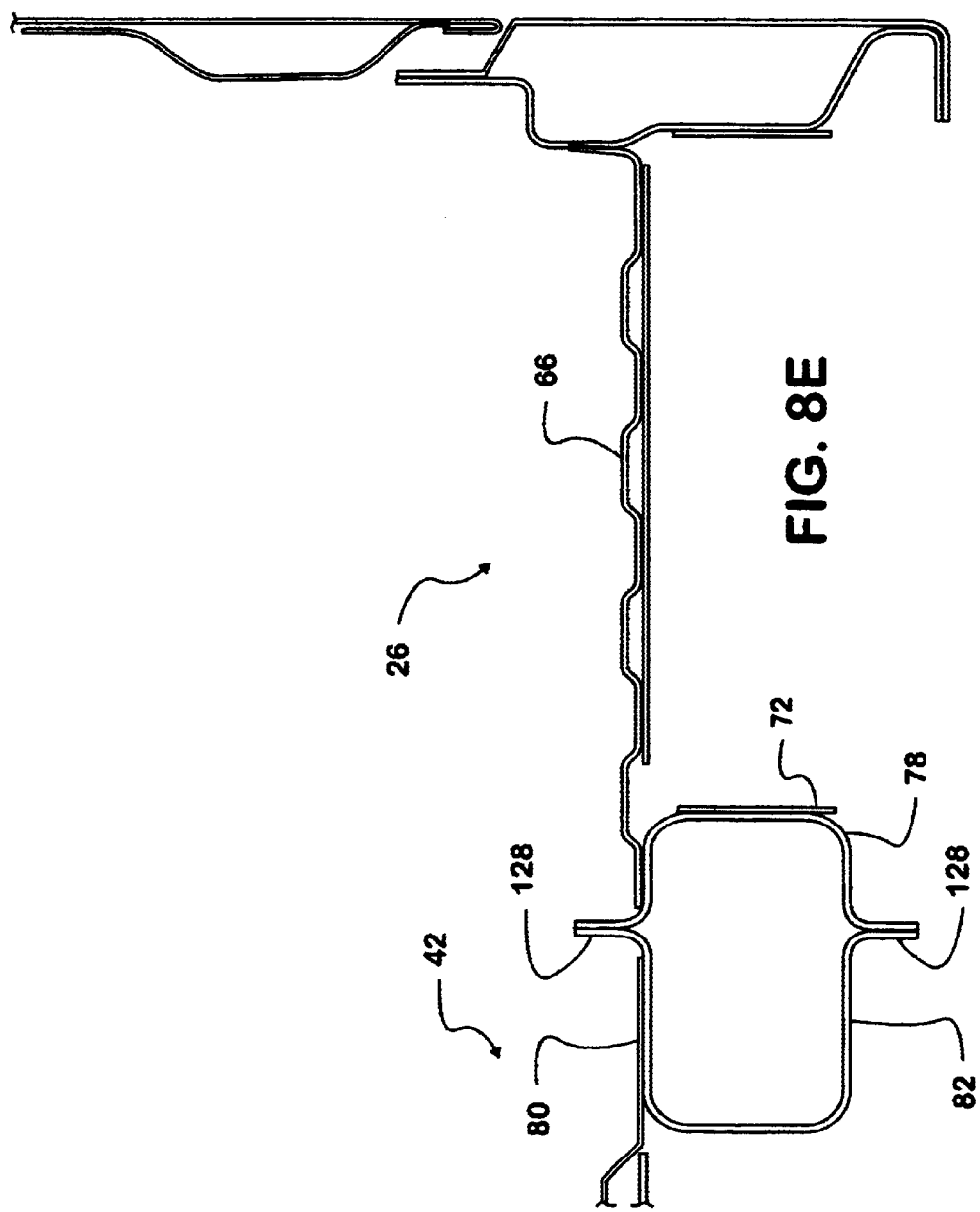

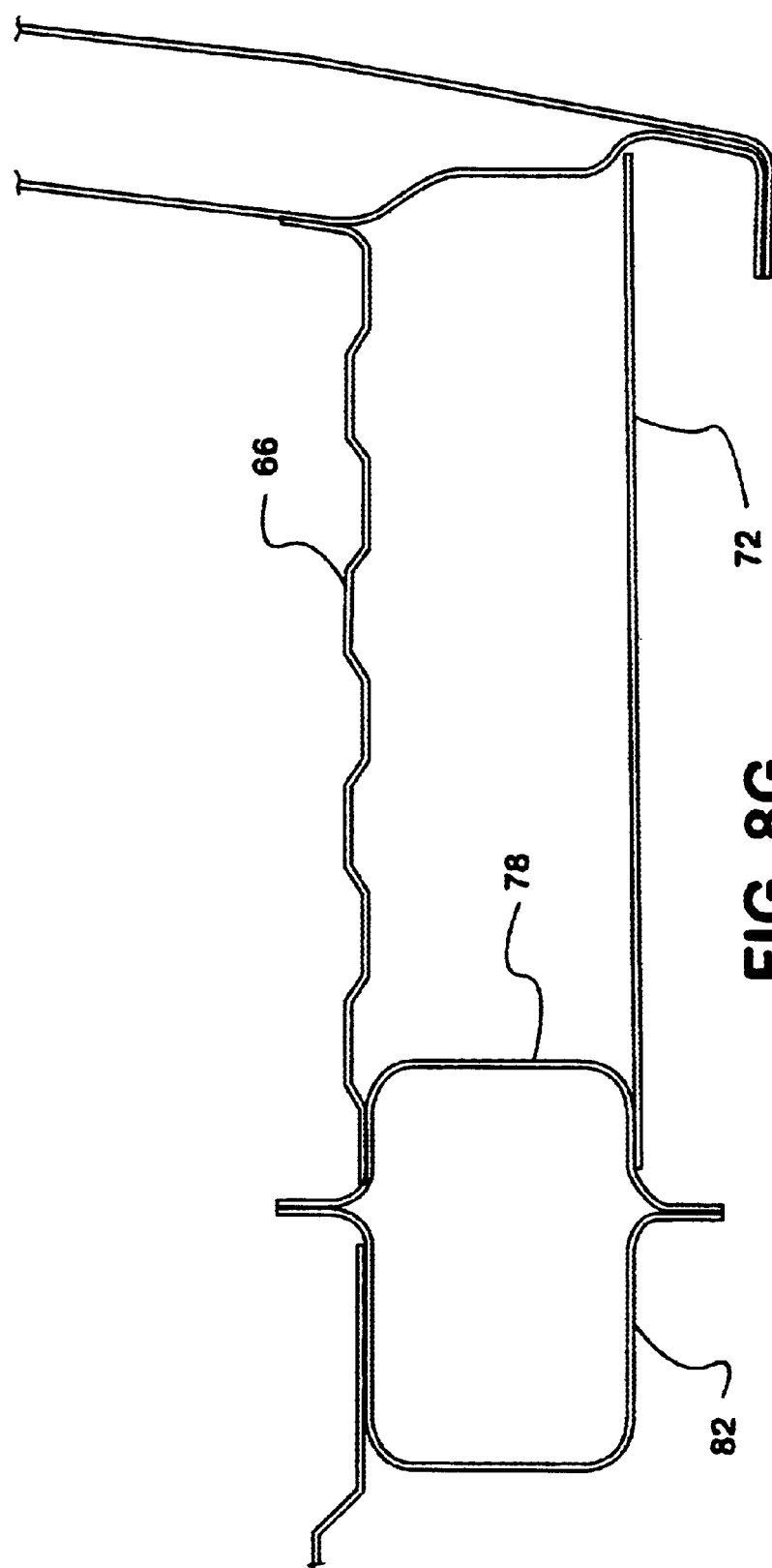

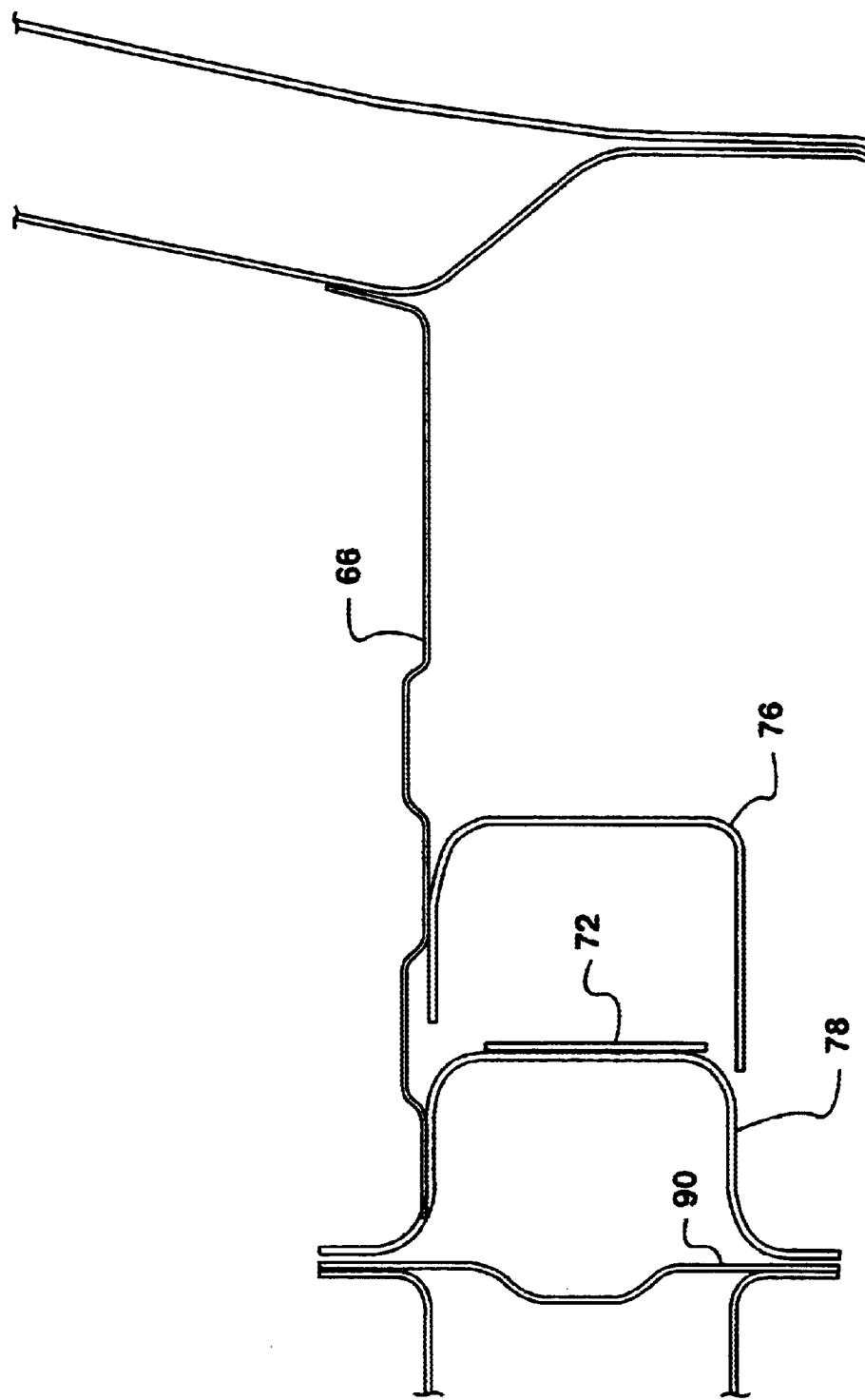

FLARE MODULE TRUCK SLEEPER CAB ASSEMBLY

BACKGROUND OF THE INVENTION

1. Field of the Invention

The present invention relates to a truck cab assembly and more specifically provides for a modular assembly of a cab extension, such as used for cab sleepers, which simplifies construction of a flared aerodynamic body for the extension using carry over parts from a straight body sleeper.

2. Description of the Problem

Long haul trucking plays a major role in North American shipping. For reasons of economy and convenience, long haul truck tractors are provided with sleepers, semi-enclosed sections of the vehicle cabs extending behind the operator section of the cab. Sleepers typically include one or more bunks for sleeping, and amenities such as tables, chairs, storage closets and the like. Living space is at a premium in these sections, in part because the permissible length of the compartments is severely limited by legal limitations on the overall length of vehicles and the need to protect the swing clearance area for a trailer attached to the truck tractor's fifth wheel. Some additional space can be obtained by widening the sleeping section compared to the operator section of the cab. Vehicle aerodynamic properties are improved if the transition between the relatively narrow operator section of the cab and the wider sleeper section is smooth and tapered. Such extended cabs are called flared sleepers.

The construction of an extended cab which varies in width along its length presents challenges both from a cost perspective and from the perspective of maintaining a good fit between components. For example, gaps of even width between doors and door pillars are widely perceived as a mark of good workmanship. Conventionally, an extended, flared sleeper cab is built on a underbody module, which forms the floor of the cabin. The floor of the underbody module has curved longitudinal edges matching the cross sectional shape of the cabin flare. Incorporating a flare into the underbody can result in manufacturing problems including problems relating to the positioning of machinery in the production line. The manufacture of underbodies of differing widths may also require different tooling to produce the different underbodies.

SUMMARY OF THE INVENTION

It would be desirable to provide a truck body with a flared, extended cab which can be constructed using as many as possible of the same core body components used in a straight wall truck cab and allowing much of the same production machinery to be used for assembly.

It would be further desirable to provide a flare cab truck body constructed in modules, with a minimum of additional components compared with a straight wall truck cab.

According to the invention there is provided a truck cab having a forward operator section and an aft living unit. The aft living unit is defined by an underbody providing a central floor area, left side and right side flare modules providing longitudinal side walls, outer portions of the floor and outer portions of the back wall, and a center back wall section between the outer portions of the back wall formed by the flare sections. The longitudinal side wall narrow on one another forward from the back wall and the outer floor portions narrow from rear to front.

The underbody has straight longitudinal sides and is adapted for mounting on a vehicle chassis. The left and right side flare modules are positioned along opposite longitudinal sides of the underbody, the side flare modules each comprising, a flare side assembly, a rear side floor panel mounted along and perpendicular to a bottom edge of the flare side assembly and backwall extensions. The underbody and first and second side flare modules are joined along a fore/aft slip joint defined along adjacent edges of the rear side floor panels and the underbody. The back wall assembly is centered between the back wall panel extensions of the flare side assemblies and is joined to those assemblies along vertical slip joints. The aft living unit is joined to the forward operator section along the sides by pillars.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 5A–B are an exploded and partially exploded views of an underbody assembly from FIG. 3A or 3B;

DETAILED DESCRIPTION OF THE INVENTION

Figure 1:
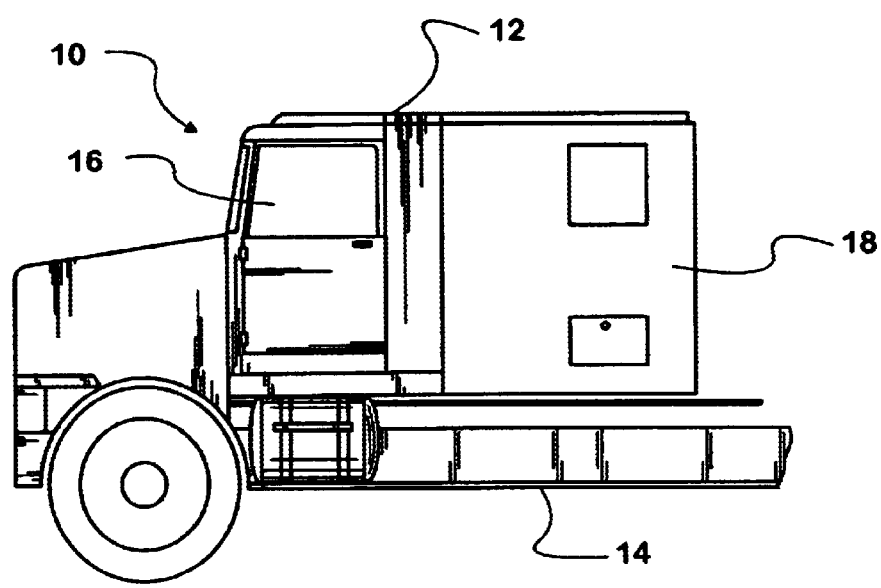
FIG. 1 is a partial side elevation of a truck incorporating the invention.

Referring now to FIG. 1, a partial side elevation of a truck 10 incorporating the invention is illustrated. Truck 10 includes a cab 12 mounted on chassis including frame rails including a left side frame rail 14. Cab 12 includes a forward operator section 16 and an aft flared sleeper unit 18.

Figure 2:
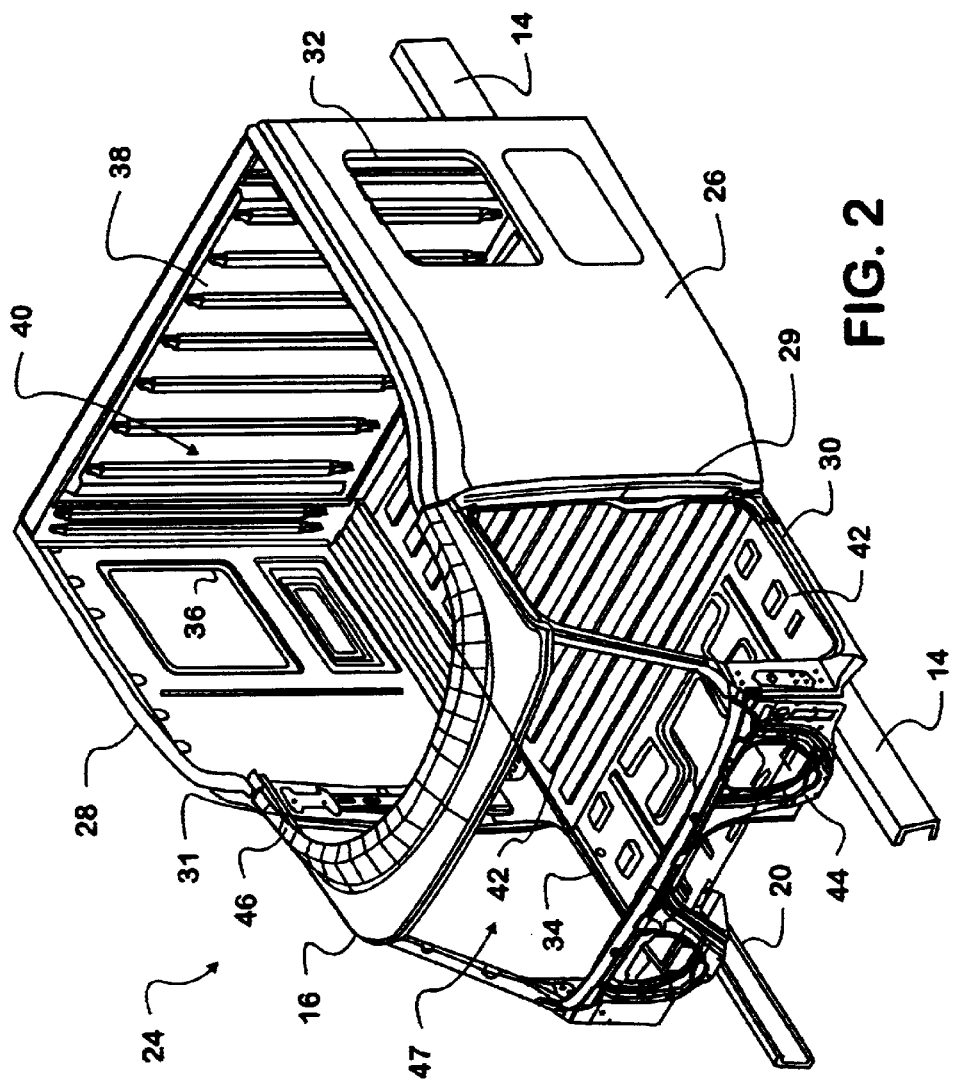
FIG. 2 is a perspective view of a truck cab body of the invention.

FIG. 2 is a perspective view of a truck cab body 24 supported on longitudinal frame rails 14 and 20. Truck cab body 24 provides the exoskeleton in which the operator seating, controls and living space are built in a completed vehicle. Truck cab body 24 is built from a left side flare module 26 and a right side flare module 25, which defines the sides of an interior sleeping compartment 40. The rear end of compartment 40 is closed in part by a back wall module 38 and portions of the flare modules 26 and 38. Flare modules 26 and 28 widen substantially immediately aft of the B-pillars 29 and 31 from the forward operator area 47 making compartment 40 wider over a substantial portion of its length. Flare modules 26 and 28 incorporate window frames 32 and 36, respectively, through the flare modules.

Forward operator section 16 of cab 12 comprises a left side front assembly 30 and a right side front assembly 34. Connected between the two side front assemblies across the front of cab body 24 is a dash assembly 44. Connected between the front assemblies across the bottom of the operator area 47 is an underbody module 42, which also extends back under the interior sleeping compartment 40 providing a portion of the floor for the interior sleeping compartment. A header assembly 46 provides a base for a roof (not shown) to the cab body 24.

Figure 3A:
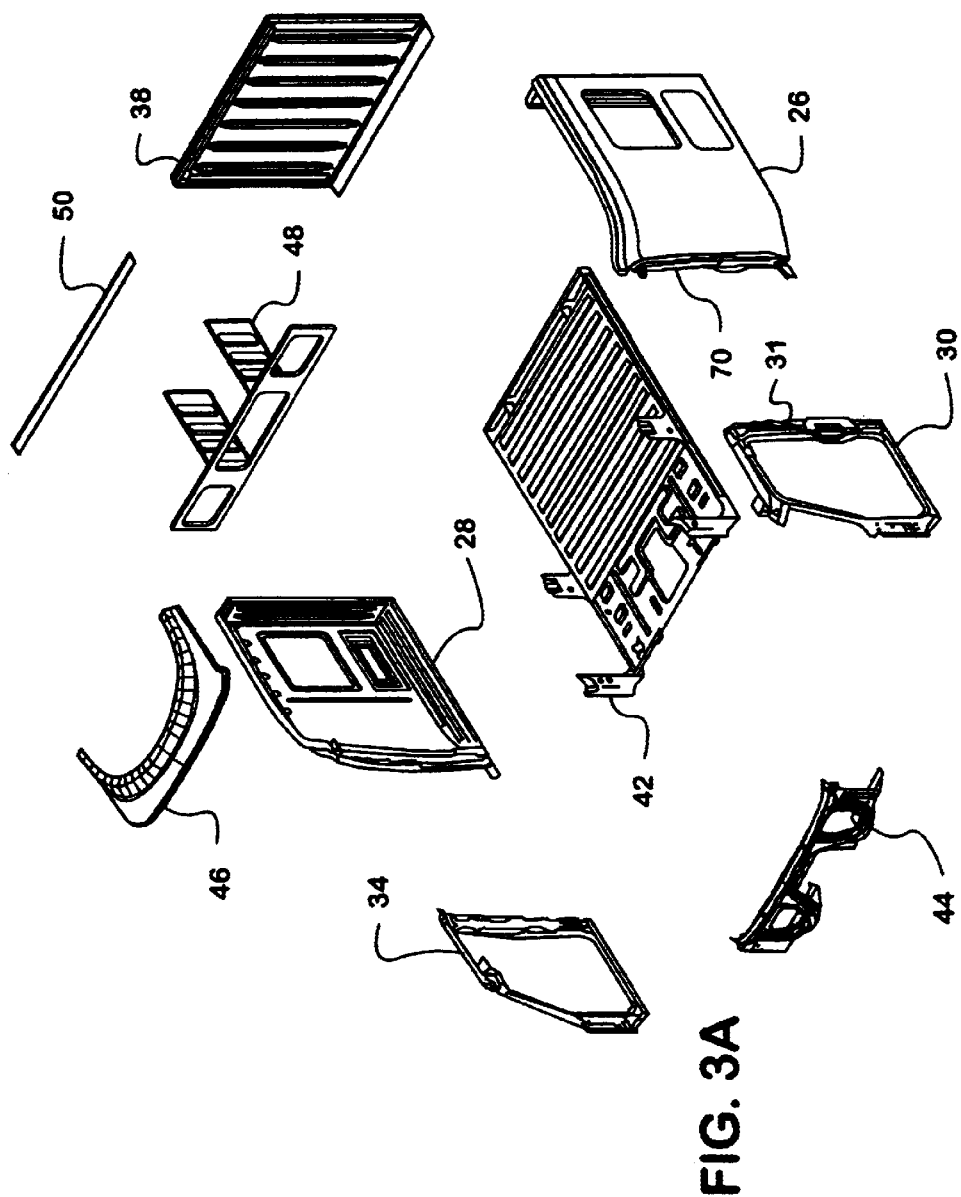
FIGS. 3A–B are exploded views of the major structural modules or subassemblies for two embodiments of the truck cab body of FIG. 2.

FIG. 3A is an exploded view of the structural subassemblies used in the assembly of the truck cab body 24 of FIG. 2. Underbody module 42 supports along its longitudinal sides, left and right front assemblies 30 and 34, and left and right flare modules 26 and 28. Conventional means, such as welding, are used for attachment. Along the rear edge of underbody module 42 is a back wall module 38. A backpanel closeout 50 is applied to the top edge of back wall module 38. A bunk support assembly 48 rests on underbody 42 just forward of back wall assembly 38. Dash assembly 44 attaches to the leading edges of left and right front assemblies 30 and 34 and a header assembly 46 attaches across the upper edges of the left and right front assemblies. Left front assembly 30 includes an inner B-pillar 31 which joins outer B-pillar 70 forming the front edge of left flare module 26. Right front assembly 34 is a mirror image of left front assembly 30.

Figure 3B:
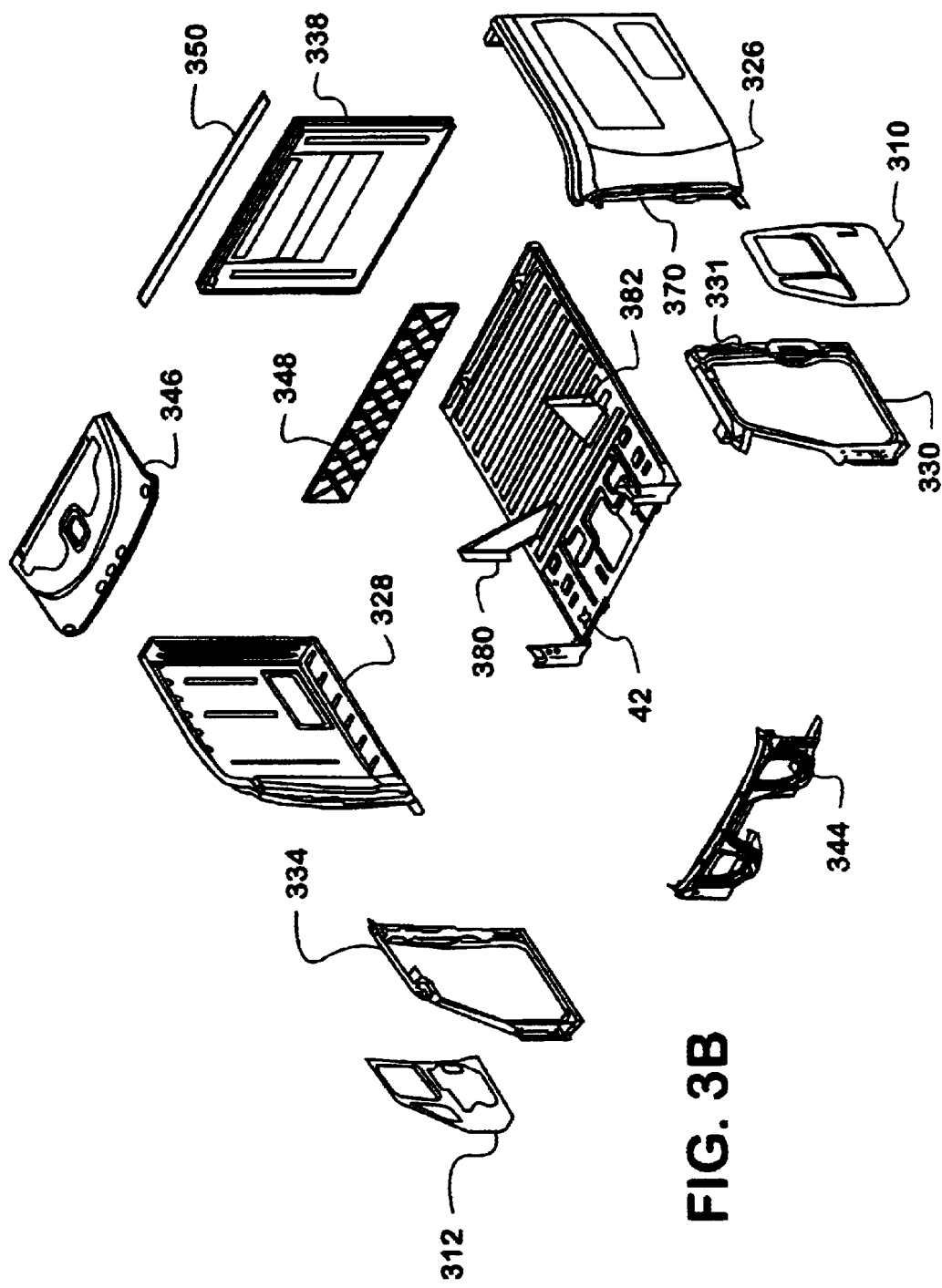

FIG. 3B is an exploded view of structural subassemblies used in the assembly of the alternative embodiment of the truck cab body 24 of FIG. 2. Underbody module 42 is a base support along its longitudinal sides for left and right front assemblies 330 and 334, and left and right flare modules 326 and 328. Along the rear edge of underbody module 42 is a back wall module 338. A backpanel closeout 350 is applied to the top edge of back wall module 338. A bunk support bulkhead 348 is positioned on underbody 42 forward of back wall assembly 338. Dash assembly 344 attaches to the leading edges of left and right front assemblies 330 and 334 and a header assembly 346 attaches across the upper edges of the left and right front assemblies. Left front assembly 330 includes an inner B-pillar 331 which joins outer B-pillar 370. B-pillar gussets 380, 382 provide lateral stabilization for the right and left flare modules 28, 26. Right front assembly 334 is a mirror Image of left front assembly 330. Doors 310 and 312 fit into left and right assemblies 330 and 334, respectively.

Figure 4A:
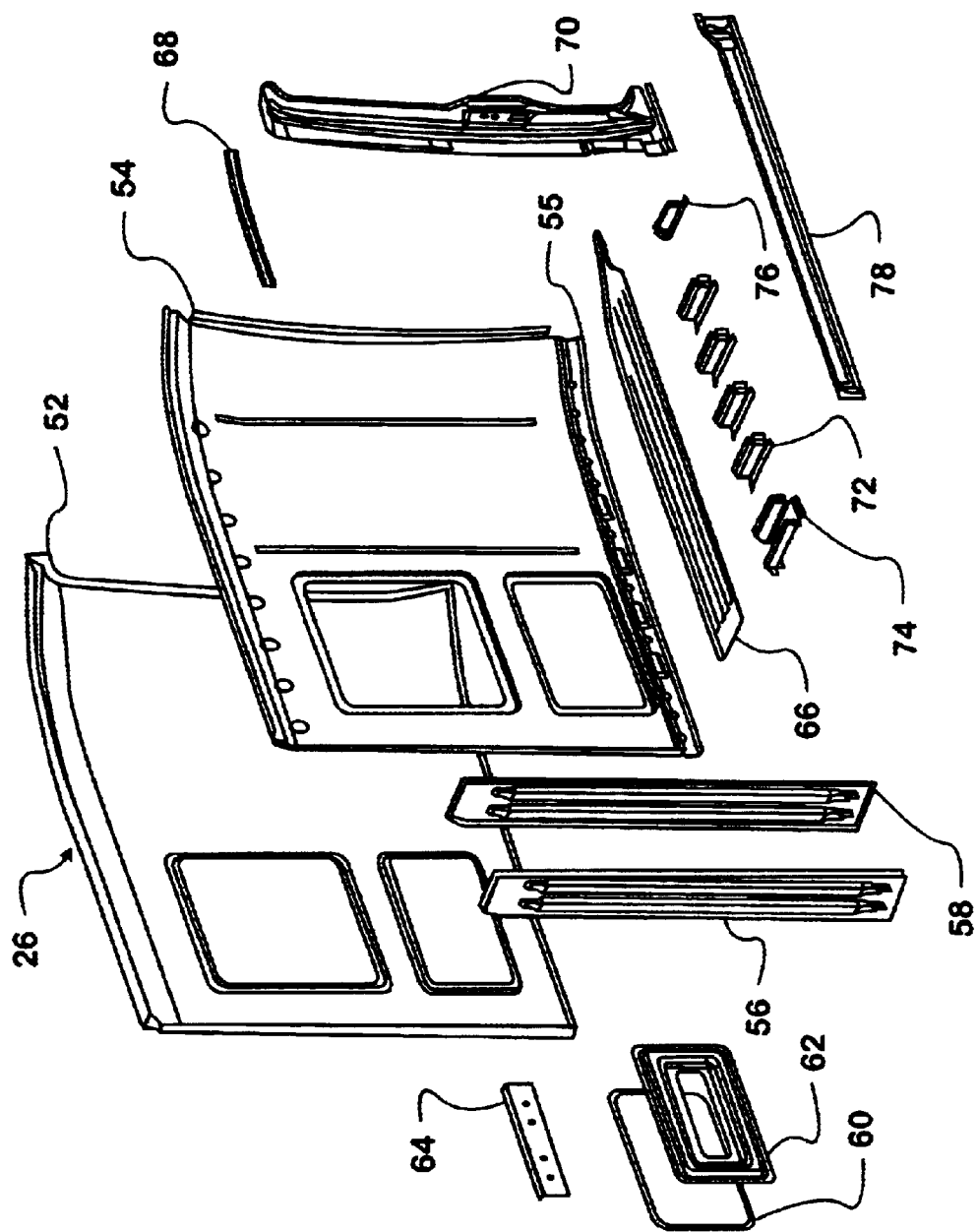
FIGS. 4A–B are exploded views of the structural subassemblies used in the assembly of a side flare module from FIG. 3A–B, respectively.

FIG. 4A is an exploded view of the structural elements used in the assembly of either side flare module 26 or 28 from the embodiment of FIG. 3A. Taking flare module 26 as representative of either module, the primary functions of flare module 26 are to provide a side wall and portions of the back wall and floor. To these ends flare module 26 comprises a side outer panel 52 and a side inner panel 54, which are mated along major surfaces and which may sandwich thermal and sound insulation (not shown). An outer back panel extension 56 and an inner back panel extension 58 attach to one another face to face and both attach along a common vertical edge to the trailing edge of joined panels 52 and 54. A rear side floor panel 66 fits against the bottom edge of inner back panel extension 58 and along a curvilinear edge inner panel 54. Rear side floor panel 66 is intend to serve as an extension to the floor and is reinforced from below by a plurality of underbody gussets 72, a rear side sill extension gusset 74 and a front rear side underbody gusset 76.

Other components of flare module 26 provide attachment points between the flare module and adjacent structures of the cab body, or for features to be added to the living area 40 of the completed cab. A luggage access door through panel 52. A cabinet mount 68 may be provided depending from the interior major surface of rear side inner panel 54. An outer B-pillar 70 attaches to the forward vertical edge of the side wall formed from rear side inner and outer panels 54 and 52. Attachment to the underbody 42 of FIG. 3A is facilitated by a rear side outer sill 78.

Figure 4B:
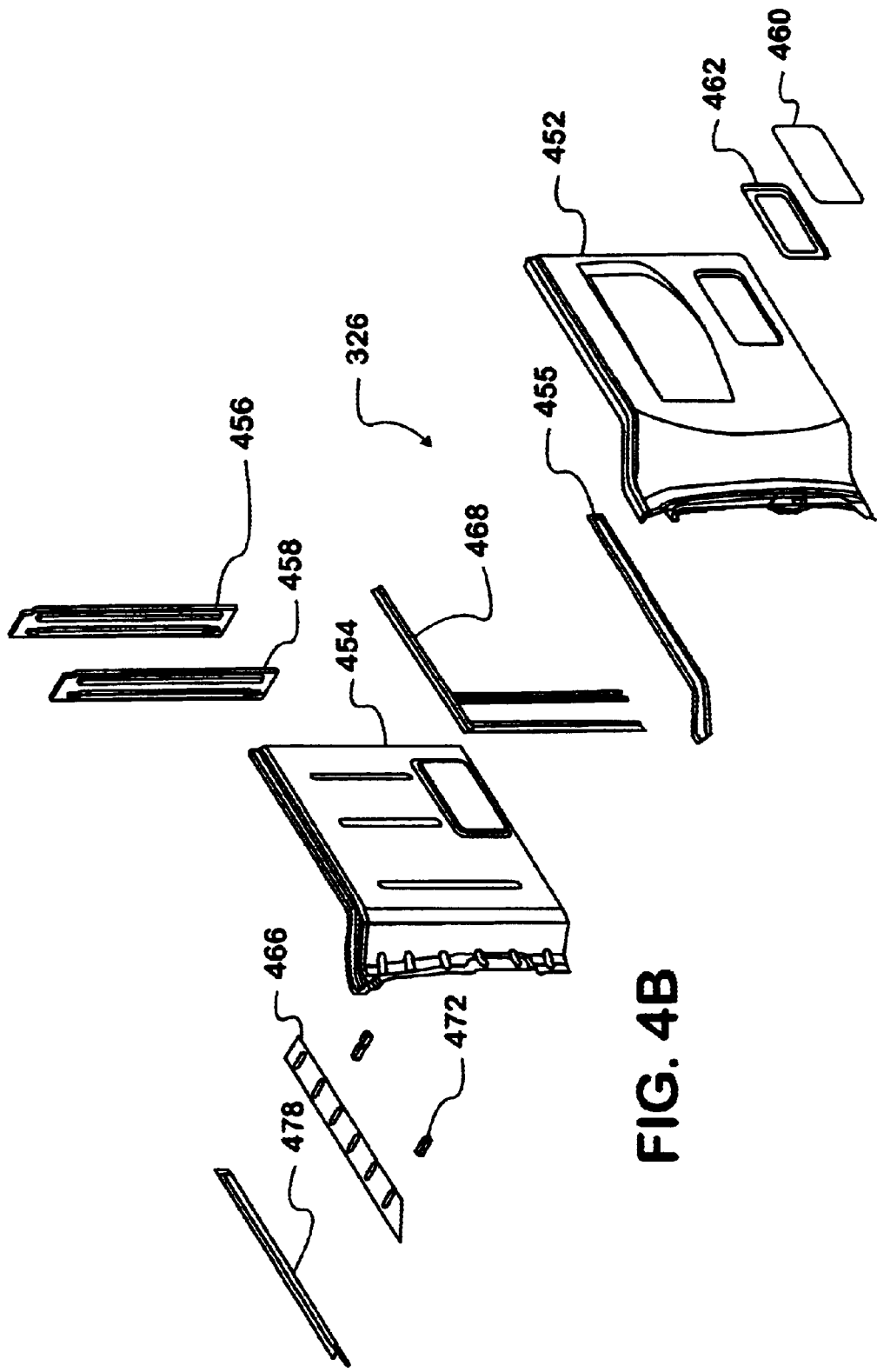

FIG. 4B is an exploded view of the structural elements used in the assembly of either side flare module 326 or 328 from the embodiment of FIG. 3B viewed from the reverse of the perspective in FIG. 4B. Taking flare module 326 as representative of either module, the primary functions of flare module 326 are to provide a side wall and portions of the back wall and floor. To these ends flare module 326 comprises a side outer panel 452 and a side inner panel 454, which are mated along major surfaces and which may sandwich thermal and sound insulation (not shown). An outer back panel extension 456 and an inner back panel extension 458 attach to one another face to face and both attach along a common vertical edge to the trailing edge of joined panels 452 and 454. A rear side floor panel 466 fits against the bottom edge of inner back panel extension 458 and along a curvilinear edge 455 to side inner panel 454. Rear side floor panel 466 is intended to serve as an extension to the floor and is reinforced from below by a plurality of underbody gussets 472. A rear side sill extension gusset and a front rear side underbody gusset are also provided in the manner shown in FIG. 4A.

Other components of flare module 326 provide attachment points between the flare module and adjacent structures of the cab body, or for features to be added to the living area 40 of the completed cab. A luggage access door through panels 452 and 454 is constructed from an outer access door panel 460, and an inner access door panel 462, which are hung from a access door hinge 464 attached to the outer panel 452. A cabinet mount 468 may be provided depending from the interior major surface of rear side inner panel 454. An outer B-pillar 70 attaches to the forward vertical edge of the side wall formed from rear side inner and outer panels 454 and 452. Attachment to the underbody 42 of FIG. 3A is facilitated by a rear side outer sill 478.

Figure 5B:
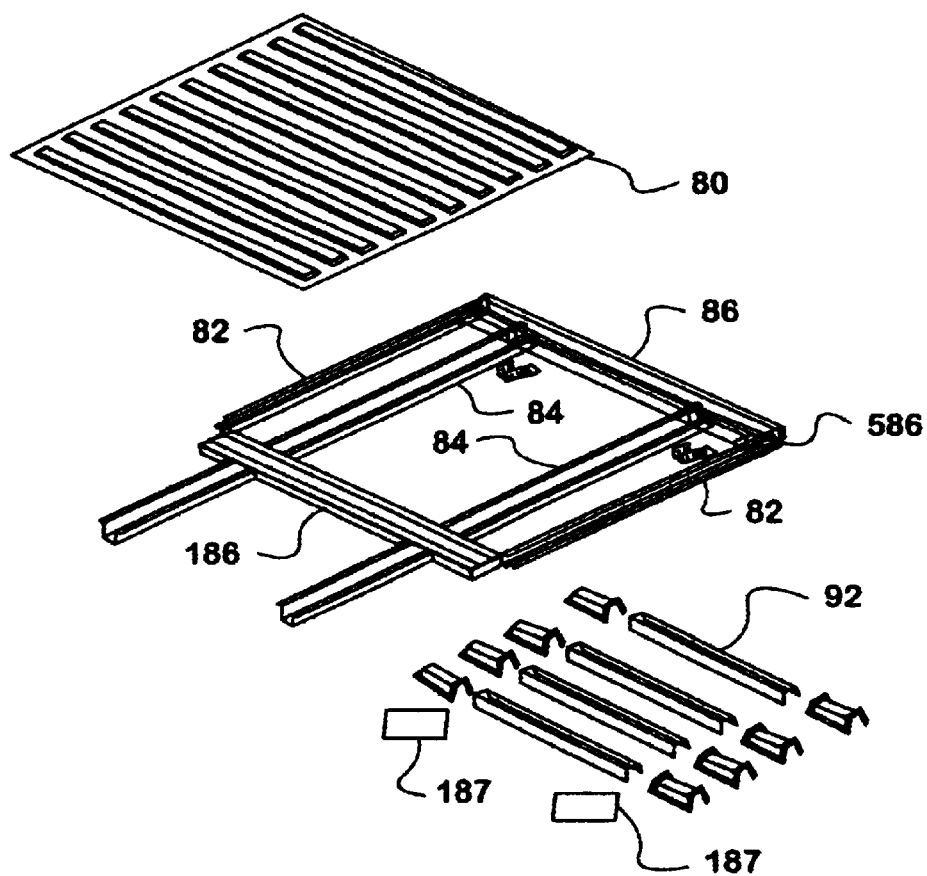

FIGS. 5A and 5B illustrate the components used to construct most of the floor for cab body 26 and in part the manner of their assembly. The primary interest is in an underbody floor panel 80 which forms the center portion of the floor under the living area 40 of the truck cab. Underbody floor panel 80 is reinforced from underneath by sills which run parallel to the side frame rails of the vehicle chassis. Among the sills are two underbody inner sills 84 and two underbody outer sills 82. Floor panel 80 is further reinforced from underneath along a rear edge by an underbody rear sill 86. The assembly comprising underbody floor panel 80 mates along its leading edge with a conventional operator area floor assembly based on an operator section pan 90 and associated cross members 92 and mounts 94. A frame 586 for supporting floor panel 80 is assembled from the sills 82 and 84, the underbody rear sill 86 and a forward heavy lateral member 186. The structure rests on air ride mounts 88 for attachment to the underbody inner sills. Underbody reinforcement plates may be used 187 as required.

Figure 6:
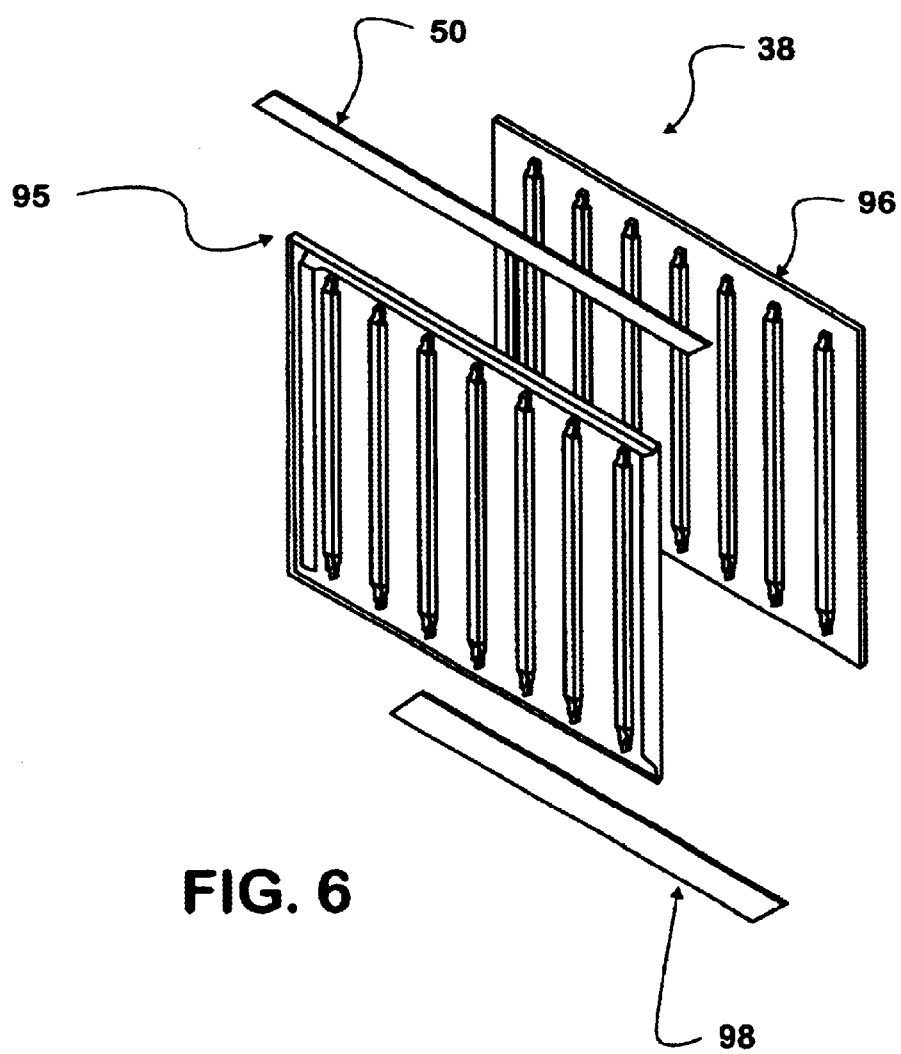
FIG. 6 is an exploded view of a back wall assembly from FIG. 3A.

FIG. 6 illustrates one way of constructing a back wall module 38, which provides the center portion of the back wall between the rear panel extensions of the flare modules. Back wall module 38 includes a center inner back panel 95 and a center outer back panel 96. Back panel upper and lower closeouts 50 and 98 are provided for positioning along the top and bottom edges of wall module 38, respectively.

Figure 7:
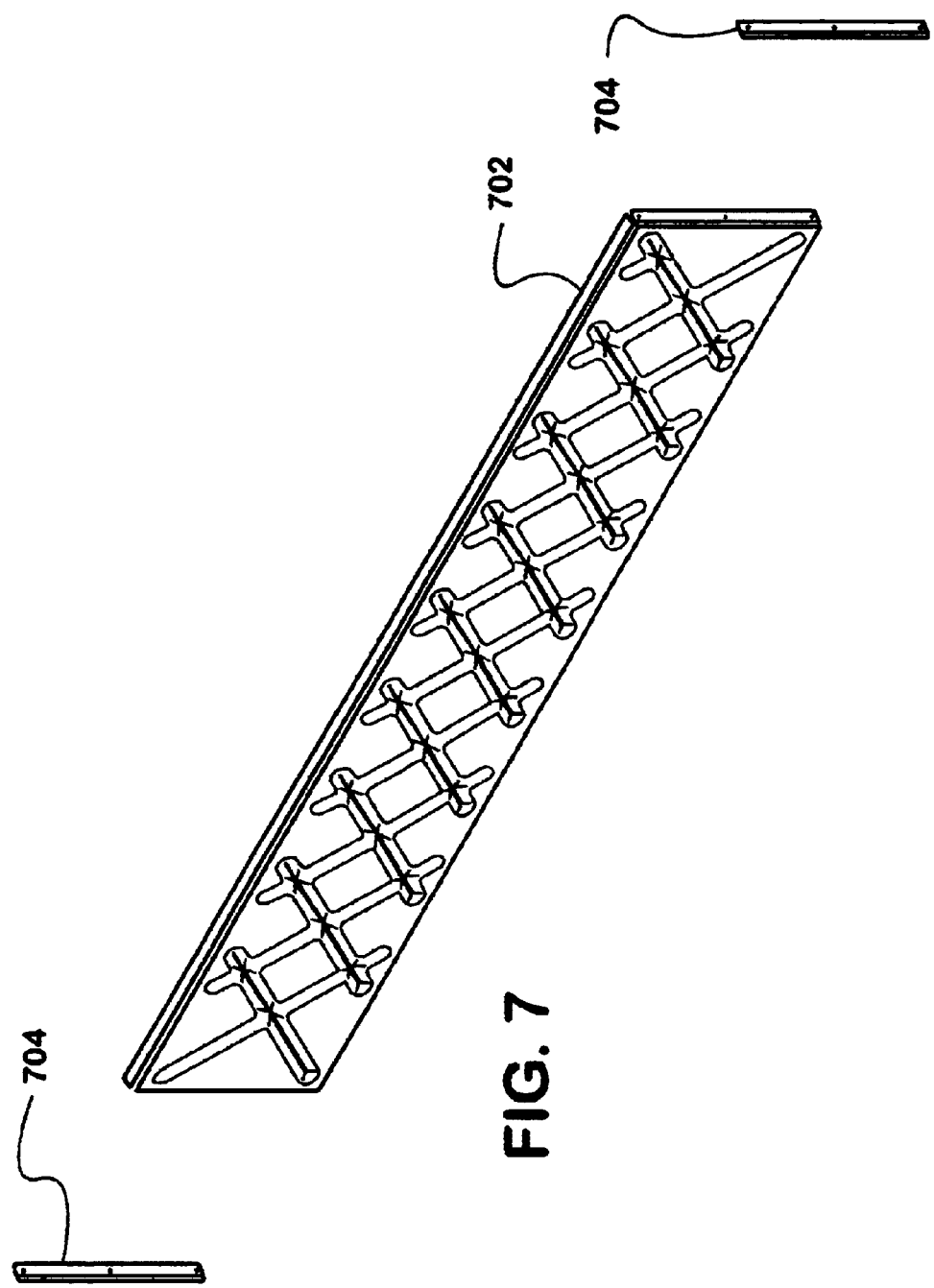
FIG. 7 is a view of a bulkhead assembly from FIG. 3B.

FIG. 7 illustrates a bulkhead 702 for which two end attachment brackets 704 are provided.

Figure 8:
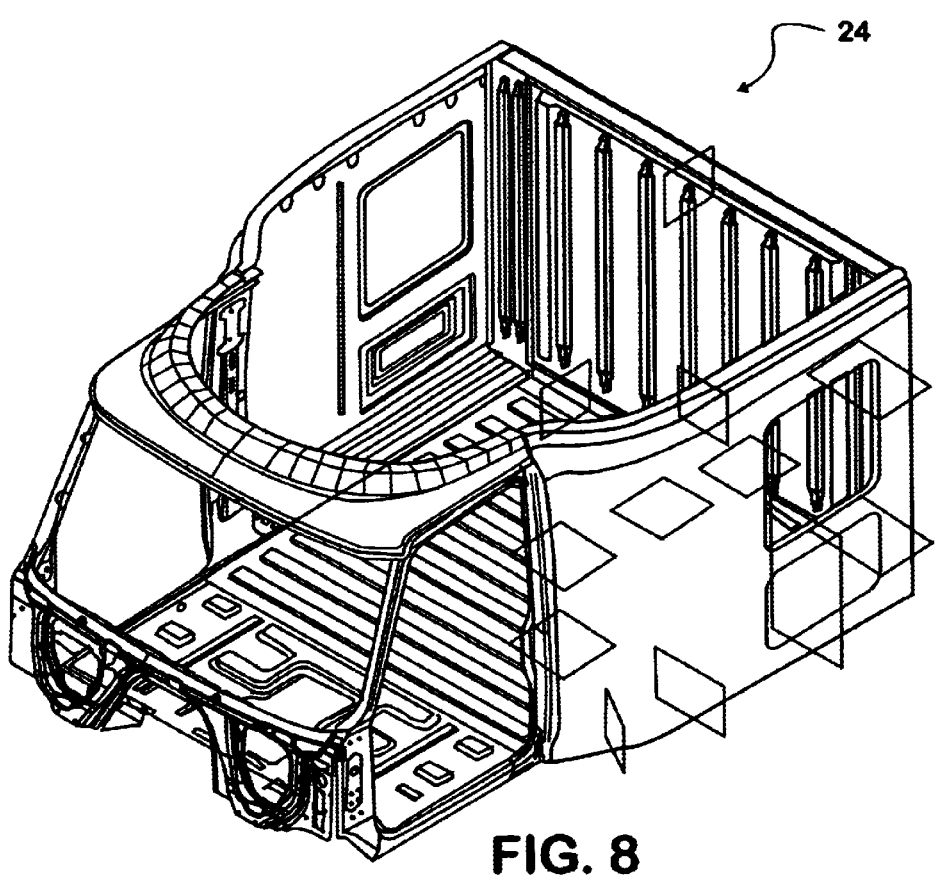
FIG. 8 is a perspective view of a truck cab body showing the locations of a plurality of sections illustrated in FIGS. 8A, B, C, D, E, G, H, and J–N.

Accurate alignment of the major sections of truck body 24 is fostered by providing slip joints where the sections meet. Referring to FIG. 8, the locations for a plurality of sections A–H, and J–N are illustrated on truck body 24.

Figure 8A:
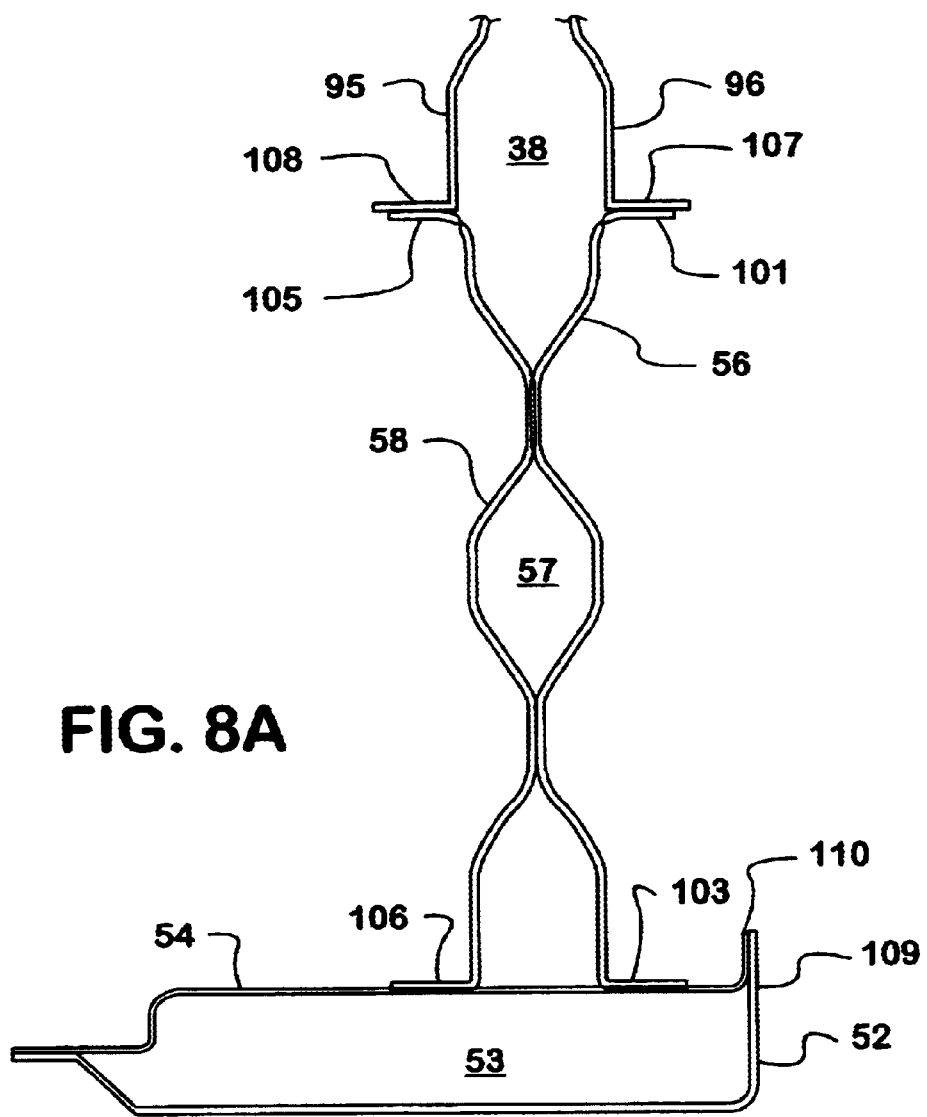

FIGS. 8A, B, D, E, G, H and J–N correspond, respectively, to sections A, B, D, E, G, H and J–N of FIG. 8. FIGS. 8A and J are cross sections of truck body 24 at the locations marked A and J in FIG. 8, and illustrates the joining of back wall module 38 to rear panel extension 57 and of rear panel extension 57 to rear side panel 53. Outer and inner rear panel extensions 56 and 58 of rear panel extension 57 terminate in flanges 101, 103, 105 and 106 to form the vertical edges of the panel extension. Wall module 38 is similarly edged by flanges 107 and 108 on center outer and inner back panels 95 and 96, respectively, which when mated with adjacent flanges 101 and 105, form a vertical slip joint between the wall module 38 and panel extension 57. Once the proper positioning of the structural elements on one another is achieved, the joining of the elements along the slip joint is done by spot welding. Additional construction details of truck body 24 are also illustrated, including the joining of real panel extension 57 to rear side inner panel 54 along flanges 103 and 106, and the joining of the rear side outer and inner panels along flanges 109 and 110. Section J further illustrates a portion of door panels 62 and 64.

Figure 8B:
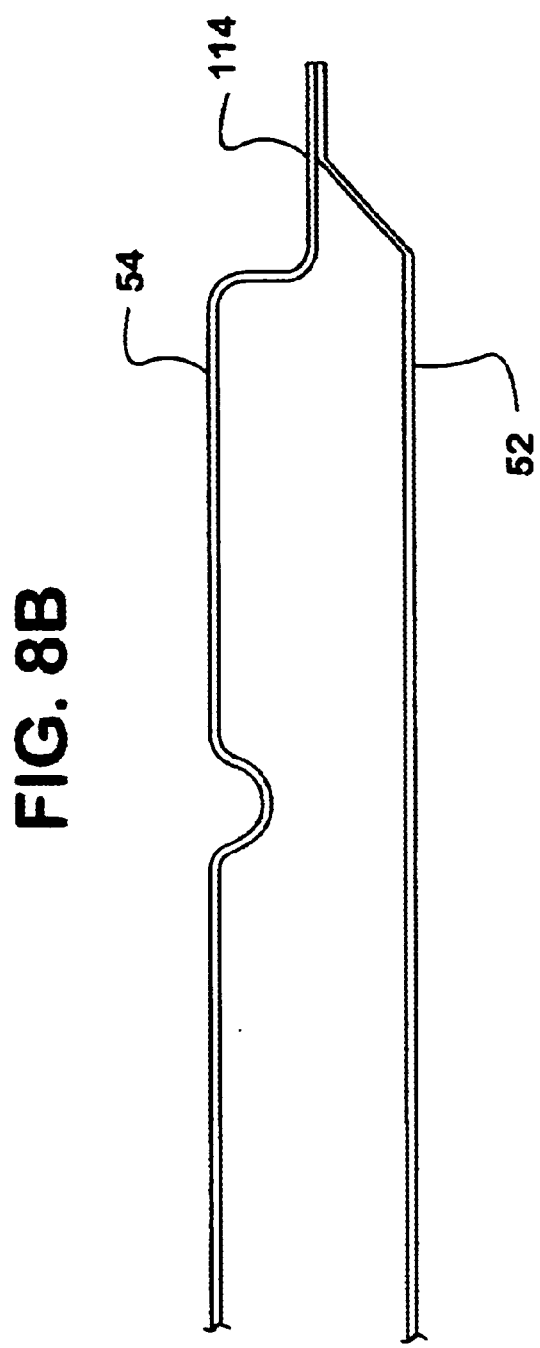
Figure 8C:
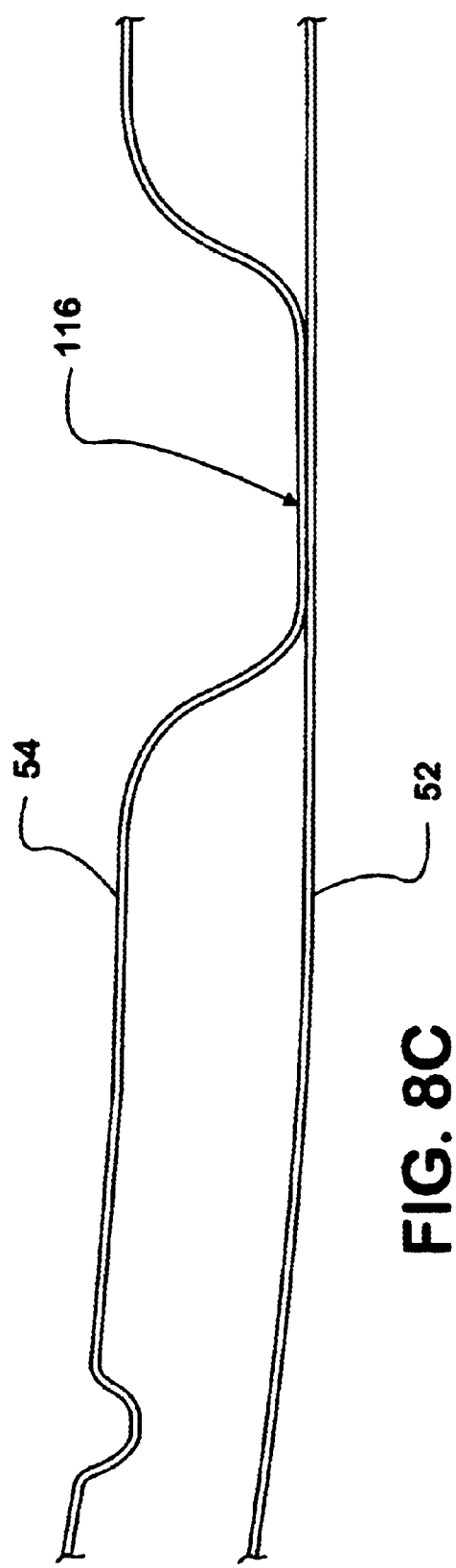

FIG. 8B illustrates mating of rear side outer panel 52 to rear side inner panel 64 along a vertical portion of window sill 114. FIG. 8C illustrates a dimple 116 in side outer panel 54 which strengthens the panel and provides a point of contact between side outer panel 54 and side inner panel 52.

Figure 8D:
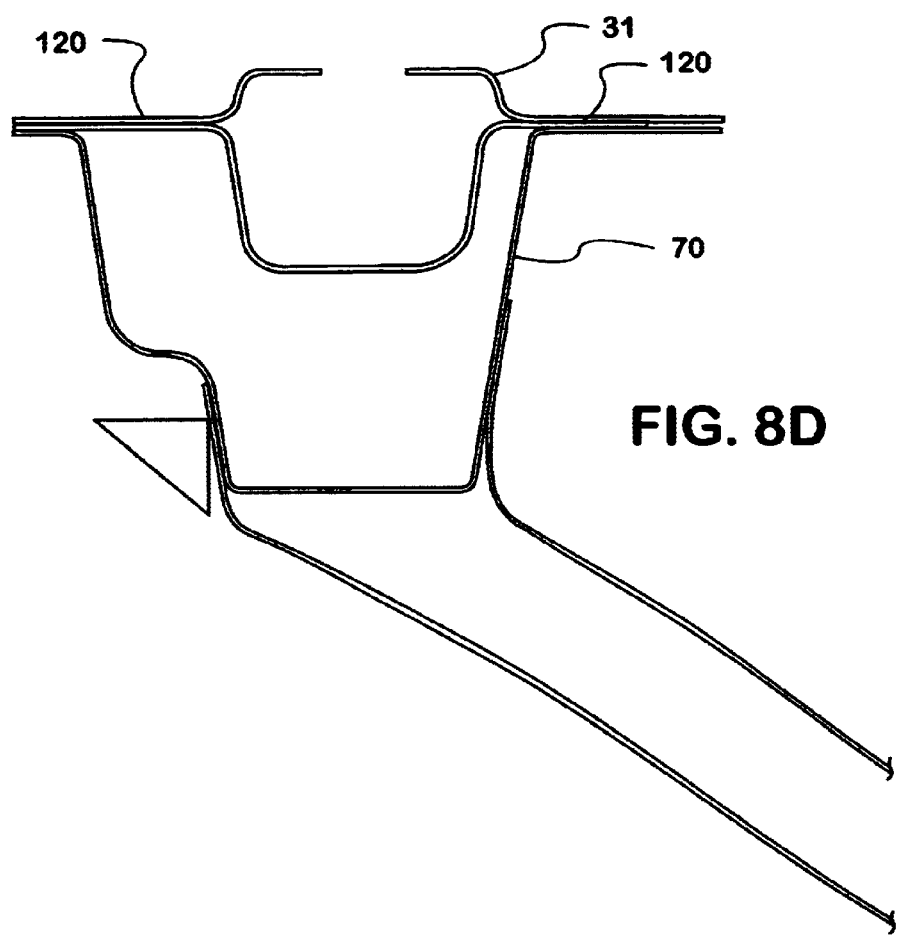
Figure 8F:
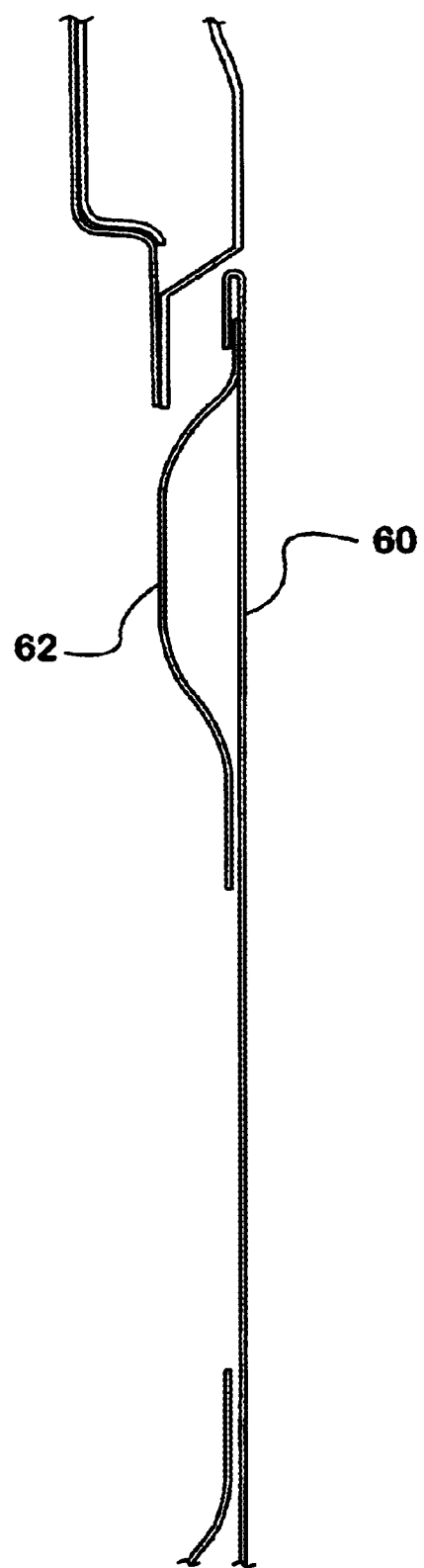
Figure 8J:
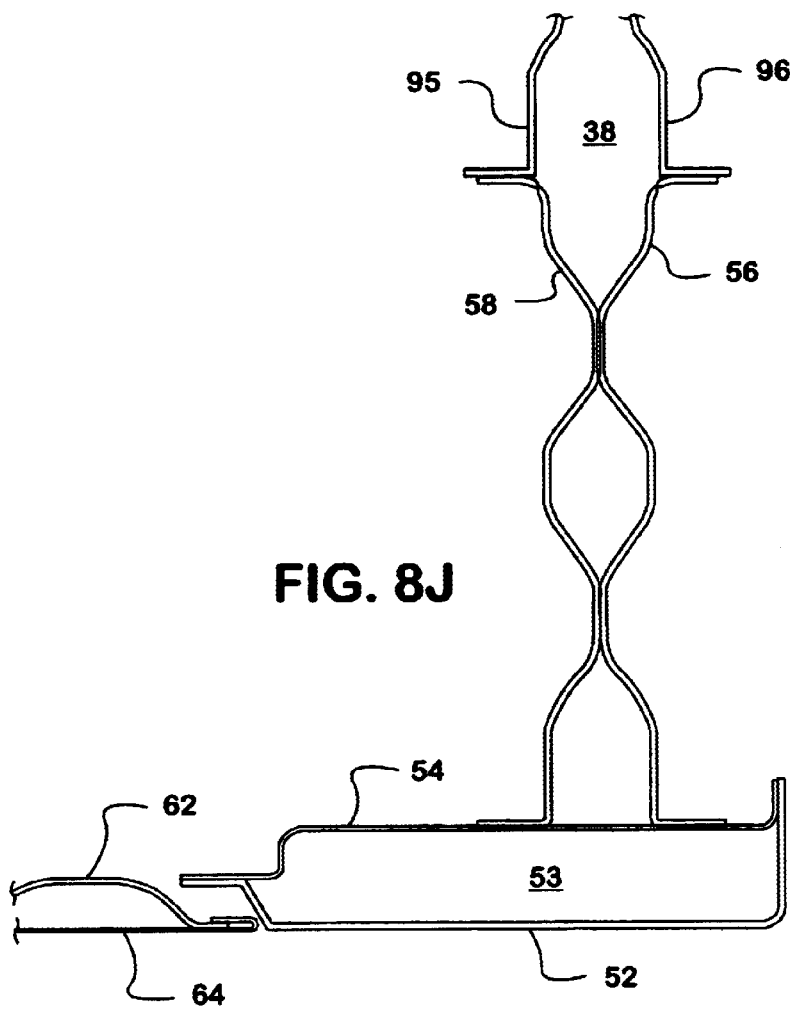
Figure 8K:
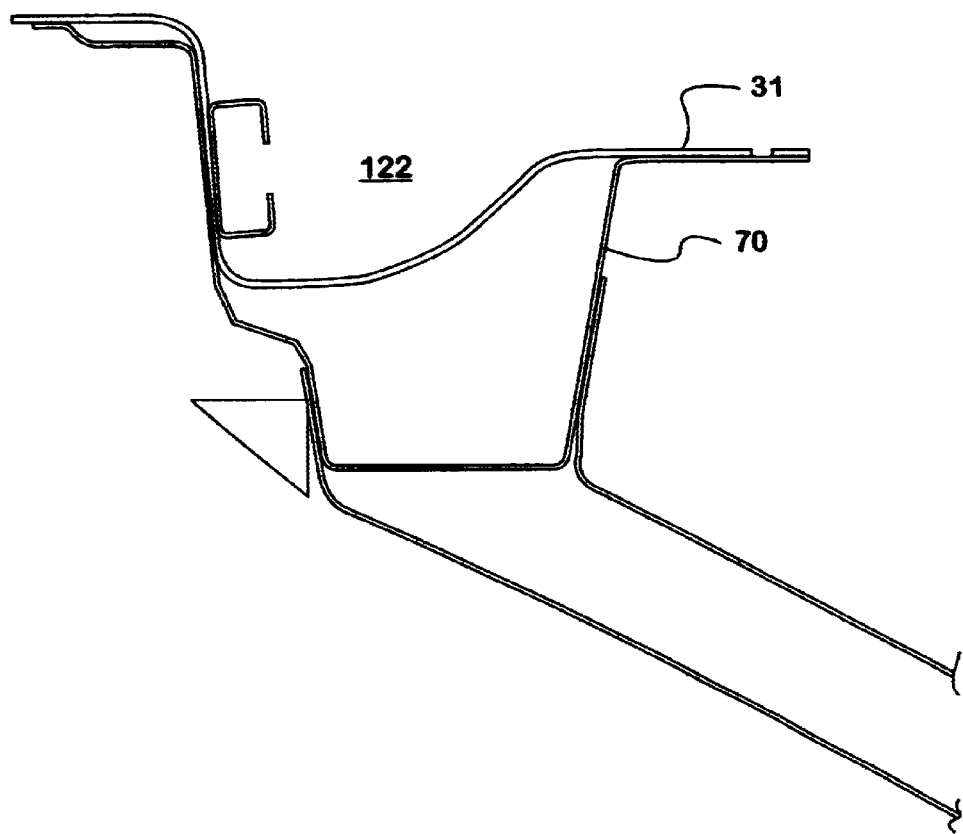

FIGS. 8D and K illustrate joinder of inner B-pillar 31 and outer B-Pillar 70 at different heights along a vertical slip joint 120. The section of FIG. 8K is taken at the height of a door latch 122.

FIGS. 8E, G and H are vertical sections taken along the base of flare module 26 and underbody module 42 moving forward, and extending to a portion of the underbody floor panel 80 and the lower portions of the flare module, including rear side floor panel 66. Flare module 26 is joined to underbody module 42 along a fore/aft slip joint formed along flanges of underbody outer sill 82 and rear side outer sill 78. Fore to aft adjustment of the position of flare module 26 is possible along with tolerance for adjustment of the angle of the flare module on the underbody module 26. The modules are preferably joined by spot welding, although other joining methods may be used, such as adhesives for gluing. The positions of various gussets 72 and 76 and flanges 128 dependent on the gussets are shown. Along the forward most section rear side outer sill 78 abuts a side rail of operator pan section 90.

Figure 8L:
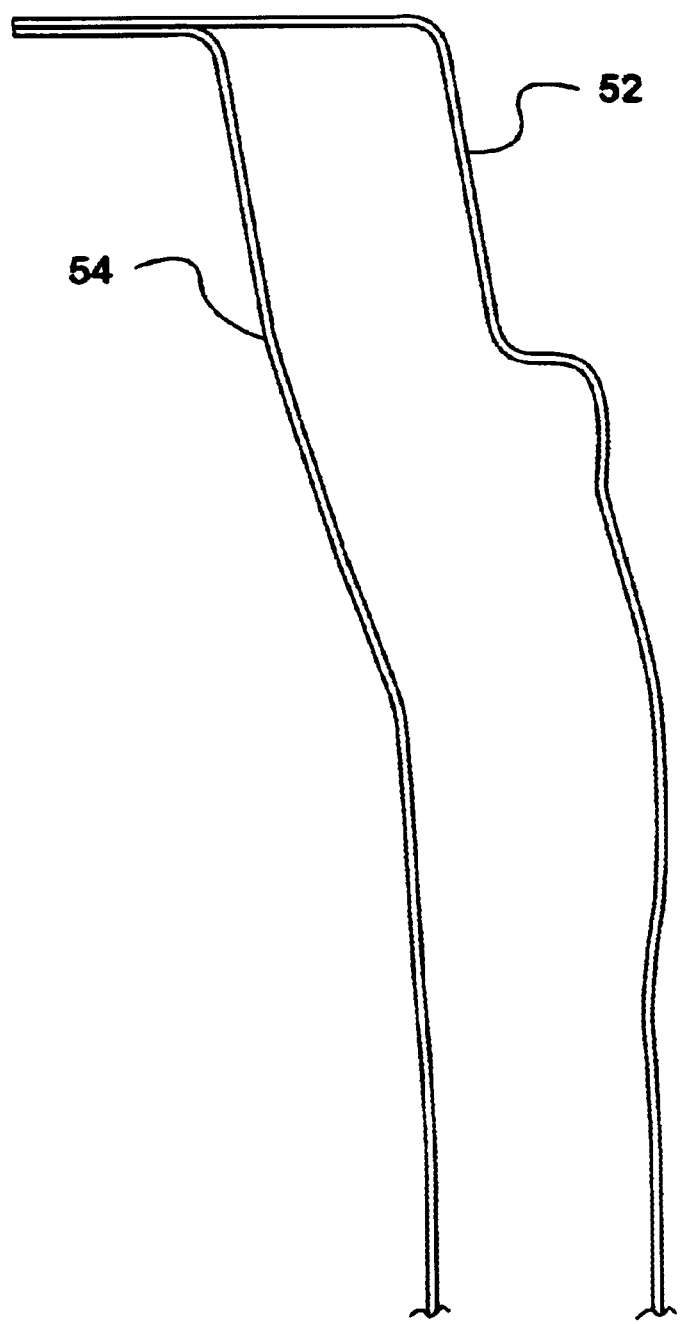

FIG. 8L is a section taken along the top edge of cab body 26 showing joining of rear side outer panel 52 with rear side inner panel 54.

Figure 8M:
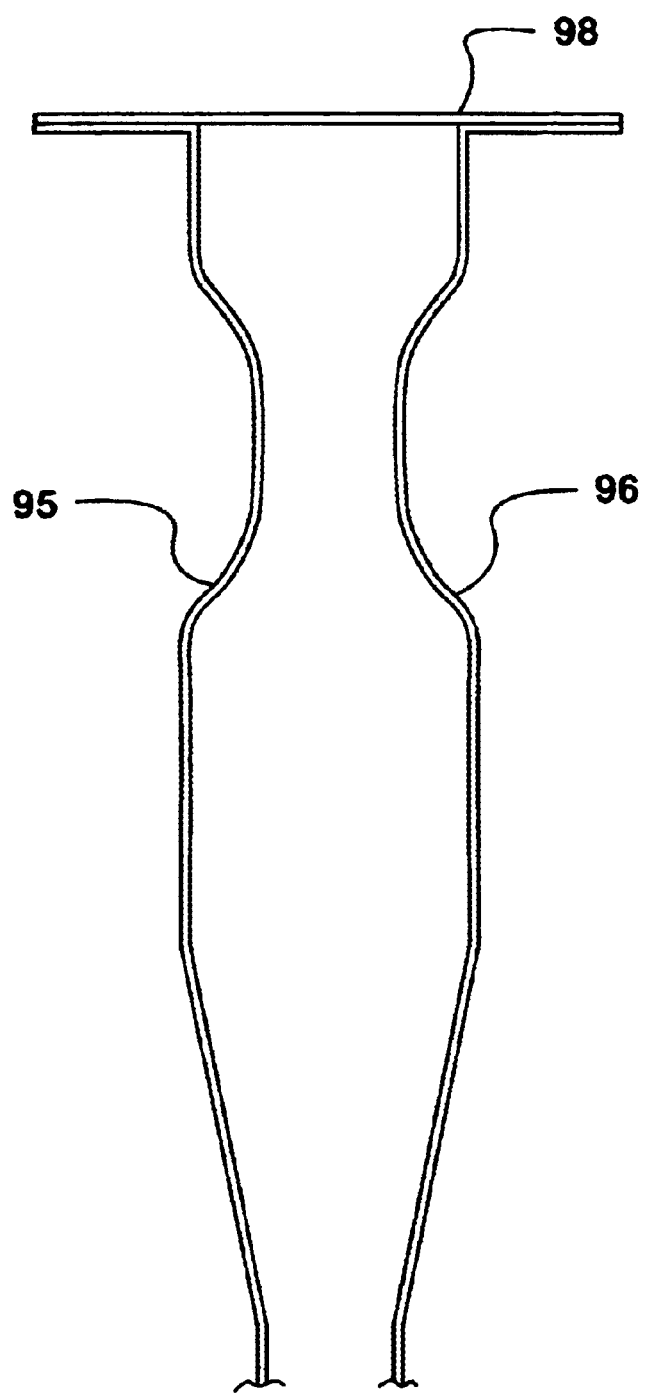

FIG. 8M is a vertical section taken along the top of the back wall module 38 illustrating positioning of the back panel upper closeout 50 on top of the center inner and outer back panels 95 and 96.

Figure 8N:
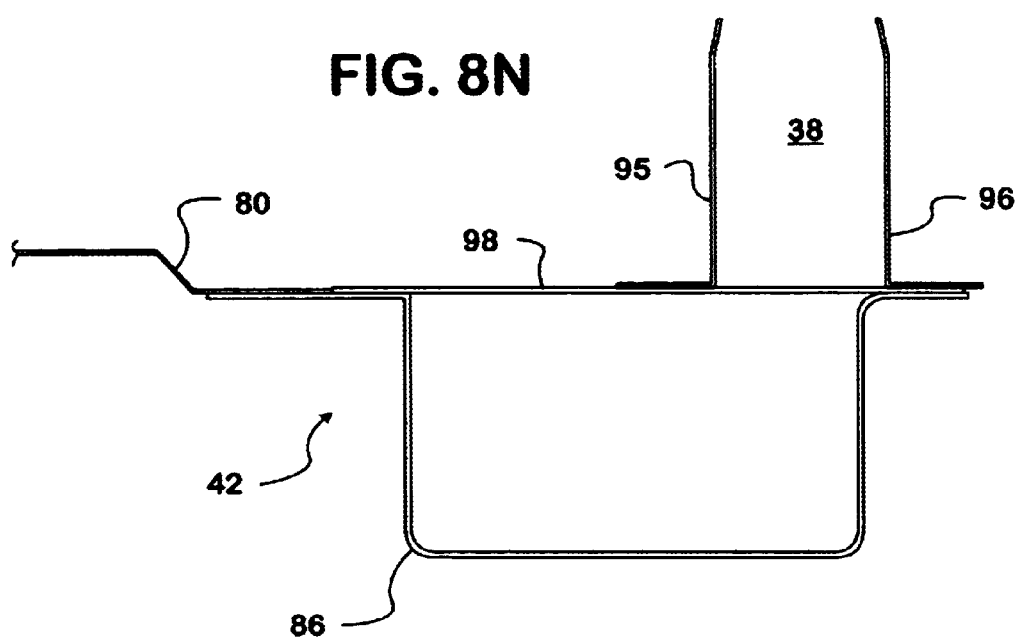

FIG. 8N is a vertical section taken along the bottom of back wall module 38 at its junction with underbody module 42. Underbody rear sill 86 is a major support element underlying back wall module 38 as well as supporting underbody floor module 42. Back panel lower closeout 98 rests on top of the open, upwardly oriented channel defined by rear sill 86. Turned out flange ends to center inner and outer back panels 95 and 96 rest on and are spot welded to closeout 98. Underbody floor panel 80 is attached to an inwardly oriented flange from rear sill 86.

The present invention provides a flare cab truck body using floor and backwall components fabricated using the same tooling as for a conventional straight side wall truck. Fit issues are dealt with using slip joints between major body components and the flared sidewall modules.

While the invention is shown in only one of its forms, it is not thus limited but is susceptible to various changes and modifications without departing from the spirit and scope of the invention.

What is claimed is:

1. A vehicle comprising:
    a chassis;
    a cab mounted to the chassis;
    an operator section to the cab;
    a sleeper section to the cab located aft of the operator section on the chassis, the sleeper section defining a living compartment with left and right side modules and a center back wall;
    an underbody of substantially uniform side to side width extending under the operator section and the sleeper section and providing a floor to the operator section and a central section of a floor for the sleeper section;
    left and right side modules comprising the left and right sidewalls for the sleeper section, each of which left and right side modules is outwardly displaced along a substantial length thereof relative to the underbody and each of which side modules has a flare section just behind the operator section alone which the left and right side modules extend outwardly from the underbody; and
    the left and right side modules further comprising left and right rear side floor panels conforming to the flare sections and extending the floor for the sleeper compartment from the underbody to the left and right sidewalls.

2. A vehicle as set forth in claim 1, the left and right side modules each further comprising:
    a rear panel extension disposed at right angles to the left rear side floor panel or to the right rear side floor panel and to the sidewall at the aft most end of the sidewall.

3. A vehicle as set forth in claim 2, wherein the left and right rear side floor panels are attached to the underbody along a fore/aft slip joint and the rear panel extensions are joined to the back wall along a vertical slip joint.

4. A vehicle as set forth in claim 3, wherein the fore/aft and vertical slip joints are spot welded.

5. A vehicle cab comprising:
    an underbody having straight longitudinal sides adapted for mounting on a chassis;
    first and second side flare modules for positioning along opposite longitudinal sides of the underbody, the side flare modules each comprising, a flare side assembly and a rear side floor panel mounted along and perpendicular to a bottom edge of the flare side assembly, the underbody and side floor panels providing a floor to the cab with the underbody extending the full width of the floor forward of leading edges of the first and second side flare modules; and
    the underbody and the first and second side flare modules being joined along a fore/aft slip joint defined along adjacent edges of the rear side floor panels and the underbody.

6. A vehicle cab as set forth in claim 5, further comprising:

a back wall assembly; and the first and second side flare modules each further comprising a back wall panel extension, which meet the back wall assembly along opposite edges of the back wall assembly to define a compartment.

7. A vehicle cab as set forth in claim 6, further comprising:

an operator section underbody forward from the underbody and narrower than the width of the compartment defined by the first and second side flare modules.

8. A vehicle cab as set forth in claim 6, further comprising:

vertical slip joints joining the back wall panel extensions of the first and second side flare modules to the opposite edges of the back wall assembly.

9. A vehicle cab as set forth in claim 6, wherein the back wall panel extensions attach along a bottom edge to an end edge of the rear side floor panels.

10. A combined truck cab comprising:

a forward operator section;

vertical pillars along the rear edge of the forward operator section;

an aft living unit, the aft living unit being defined by an underbody providing a central floor area for a floor, left and right side flare modules providing longitudinal side walls, outer floor portions and outer rear wall portions and a center back wall section;

the outer floor portions aligning with the central floor area to form the floor with the outer floor portions narrowing from rear to front;

the longitudinal side walls narrowing on one another from rear to front; and the aft living unit being joined to the forward operator section along the pillars.

* * * * *